(12) United States Patent
Lin

(10) Patent No.: US 6,902,483 B2
(45) Date of Patent: Jun. 7, 2005

(54) HANDHELD ELECTRONIC GAME DEVICE HAVING THE SHAPE OF A GUN

(76) Inventor: Xiao Lin, Room 901, 902 Tower B East, Athena Garden, 48 Rong Hua East Road, Gu Bei District, Shanghai 201103 (CN)

( * ) Notice: Subject to any disclaimer, the term of this patent is extended or adjusted under 35 U.S.C. 154(b) by 356 days.

(21) Appl. No.: 10/114,904

(22) Filed: Apr. 1, 2002

(65) Prior Publication Data

US 2003/0186742 A1 Oct. 2, 2003

(51) Int. Cl.[7] .................................................. A63F 13/04
(52) U.S. Cl. ............................... 463/37; 463/5; 463/43; 434/20; 434/22; 273/148 B
(58) Field of Search ................................ 434/16–24; 463/5, 463/36, 606, 38, 49, 57, 7, 2; 273/148.13

(56) References Cited

U.S. PATENT DOCUMENTS

| | | | | |
|---|---|---|---|---|
| 4,813,682 A | * | 3/1989 | Okada ........................... 463/5 |
| 4,844,476 A | * | 7/1989 | Becker ........................... 463/5 |
| 4,895,376 A |   | 1/1990 | Chiang Shiung-Fei ...... 273/313 |
| 4,976,429 A |   | 12/1990 | Nagel ......................... 273/1 E |
| 4,988,111 A | * | 1/1991 | Gerlizt et al. ................... 463/5 |
| 5,310,192 A | * | 5/1994 | Miyake .......................... 463/5 |
| 5,569,085 A | * | 10/1996 | Igarashi et al. ............... 463/49 |
| 5,641,288 A | * | 6/1997 | Zaenglein, Jr. ............... 434/21 |
| 5,672,108 A |   | 9/1997 | Lam et al. .................... 463/39 |
| 5,683,297 A |   | 11/1997 | Raviv et al. .................. 463/34 |
| 5,853,324 A | * | 12/1998 | Kami et al. ..................... 463/2 |
| 5,982,354 A | * | 11/1999 | Arita et al. .................. 345/158 |
| 6,012,980 A | * | 1/2000 | Yoshida et al. ................ 463/2 |
| D433,074 S |   | 10/2000 | Clemmer .................... D21/324 |
| 6,146,278 A | * | 11/2000 | Kobayashi .................... 463/53 |
| 6,171,190 B1 | * | 1/2001 | Thanasack et al. ........... 463/51 |
| 6,248,017 B1 |   | 6/2001 | Roach .......................... 463/37 |
| 6,287,198 B1 | * | 9/2001 | McCauley .................... 463/37 |
| 6,328,650 B1 |   | 12/2001 | Fukawa et al. ............... 463/36 |
| 6,545,661 B1 | * | 4/2003 | Goschy et al. .............. 345/158 |
| 6,549,191 B2 | * | 4/2003 | Leman ........................ 345/168 |
| 6,672,962 B1 | * | 1/2004 | Ozaki et al. .................. 463/37 |
| 2001/0031662 A1 |   | 10/2001 | Larian .......................... 463/36 |
| 2002/0022518 A1 | * | 2/2002 | Okuda et al. ................. 463/36 |
| 2003/0166415 A1 | * | 9/2003 | Wu .............................. 463/37 |

* cited by examiner

Primary Examiner—Michael O'Neill
(74) Attorney, Agent, or Firm—Hogan & Hartson, LLP

(57) ABSTRACT

A handheld electronic game device shaped as a toy gun with two handles and two triggers, and one or more built-in display screens. The device may be played as a stand-alone device, or played with an external game unit having a display screen. When played with an external unit, the handheld device and the external unit may be provided with an aiming relationship detection system to detect an aiming of the handheld device with respect the display screen of the external unit. In one example, the screen of the external unit displays a terrain or a scene seen by the player, and the built-in display of the handheld device simulates a view seen through a scope used on traditional guns. An additional display screen may be provided on the handheld device to simulate a radar scan or satellite image.

16 Claims, 3 Drawing Sheets

HANDHELD ELECTRONIC GAME DEVICE HAVING THE SHAPE OF A GUN

BACKGROUND OF THE INVENTION

1. Field of the Invention

This invention relates to a handheld electronic game device.

2. Description of the Related Art

Many electronic games devices have been designed to simulate the shape of a weapon. For example, U.S. Design Pat. D433,074 shows a handheld electronic game device having the shape of a handgun. U.S. Pat. No. 6,328,650 describes a video game played with handgun-shaped handheld unit connected to a game machine with a display screen. U.S. Pat. No. 6,248,017 describes a handheld electronic game having a housing shaped like a fighter ship. U.S. Pat. No. 5,672,108 describes an electronic game device including an emitter unit and a target unit used together, the emitter unit having the shape of a gun and emits an electromagnetic radiation, the target unit having a display screen and an electromagnetic radiation sensor. U.S. Pat. No. 4,895,376 describes a video game device in the shape of a gun having an LCD display. The gun is mounted on a base via a connecting joint that can detect the rotation of the gun. U.S. Pat. Publication No. 2001/0031662 describes an electronic game device having a head-mount unit and a handheld unit wireless coupled together. The handheld unit may have the shape of a gun for a shooting game.

SUMMARY OF THE INVENTION

The present invention is directed to a handheld electronic game device having a novel exterior structure and game control method that enhances the variety of game play.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an electronic game device shaped as a toy gun, including a main body, two handles connected to the main body on an underside, each handle being adapted to be held by a hand of a player, two trigger devices each provided for a handle and adapted to be activated by a finger of the player while holding the handles, and a control section carried within the maim body and/or the handles, wherein the two trigger devices are electrically connected to the control section to provide input signals thereto.

In another aspect of the invention, a handheld electronic game device is played with an external game unit in an electronic game system, which includes an external game unit having a display screen for displaying game images, a handheld unit shaped as a toy gun and with a main body, two handles and two trigger devices, and one or more control sections coupled to the display screen of the external game unit and the two trigger devices of the handheld unit, the control section controlling the images displayed on the display screen of the external game unit in response to input signals received from the two trigger devices. The system may further include an aiming relationship detection system provided in the external game unit and the handheld unit to detect an aimed-at position with respect to areas on the display screen of the external game unit.

In another aspect, the present invention provides an electronic game system including an external game unit having a display screen for displaying game images, a handheld unit shaped as a toy gun, the handheld device having a trigger device for generating input signals and a display screen for displaying game images, one or more control sections coupled to the display screen of the external game unit, the display screen of the handheld unit, and the trigger device of the handheld unit, wherein the control section controls the images displayed on the display screen of the external game unit and the display screen of the handheld unit in response to input signals received from the trigger device, and wherein the control section is capable of displaying correlated images on the display screen of the external game unit and the display screen of the handheld unit. The system may further include an aiming relationship detection system provided in the external game unit and the handheld unit to detect an aimed-at position with respect to areas on the display screen of the external game unit.

It is to be understood that both the foregoing general description and the following detailed description are exemplary and explanatory and are intended to provide further explanation of the invention as claimed.

DETAILED DESCRIPTION OF THE PREFERRED EMBODIMENTS

The handheld electronic game device according to embodiments of the present invention has a novel shape of a toy gun with two handles and two triggers each associated with a handle. This shape allows a player to hold the gun with both hands and control the game play using the two triggers. The electronic games played with this device may simulate a battle or shooting scene, involving different types of weapons, different environments and conditions, etc., and the two triggers are used to fire various weapons. The handheld game device may have one or more built-in display screens and be played as stand-alone device, or it may be played with an external game unit such as a game machine with a display screen, a television set, a PC, etc., with or without built-in display screens. When played with an external unit, the handheld device and the external unit may be provided with an aiming relationship detection system to detect an aiming relationship of the handheld device with respect to areas on the display screen of the external unit. In one example, where a handheld device with a built-in display screen is played together with an external unit, the screen of the external unit displays a terrain or a scene seen by the player, and the built-in display(s) of the handheld device simulates a view seen through a scope used on traditional guns and/or a radar scan or satellite image.

Figure 1:
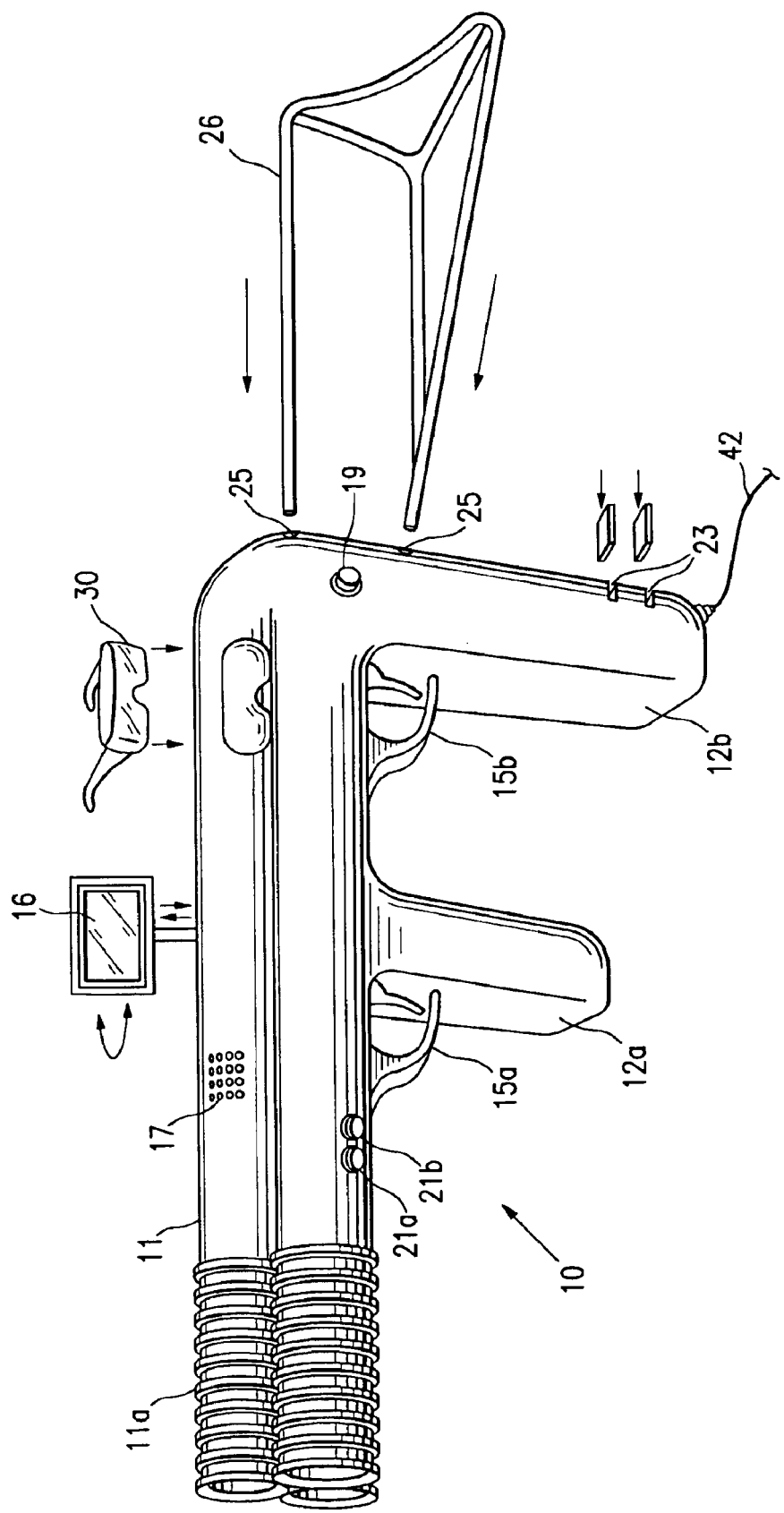
FIG. 1(a) is a side view of a handheld electronic game device according to an embodiment of the present invention.
FIG. 1(b) is a perspective view of a handheld electronic game device according to an embodiment of the present invention.
Figure 1B:
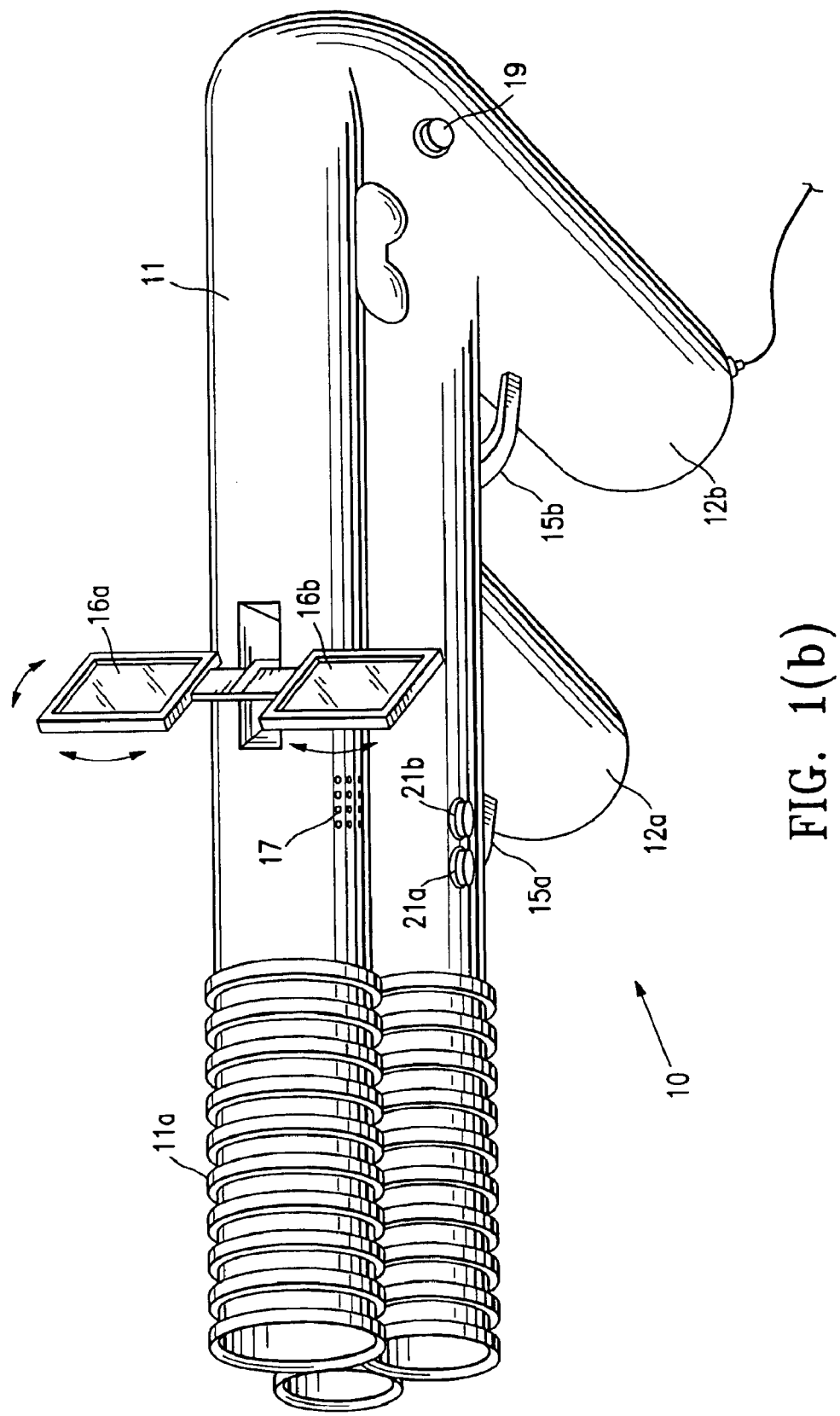

Referring to FIGS. 1(a) and 1(b), a handheld electronic game device 10 according to embodiments of the present invention has a main body 11, which may have the shape of a barrel of a gun, and may include one or more muzzles 11a (three are shown in FIG. 1(a)). Two handles 12a and 12b are connected to the body on the underside that can be held with the two hands of a player. Two trigger devices 15a and 15b are disposed adjacent the handles 12a and 12b, respectively, and can by operated by the two hands of the player. When playing, the two trigger devices 15a, 15b function as the primary control of the game play and control the firing of the gun. Optionally, a rear member 26 may be detachably attached to the main body via one or more attachment slots 25 to provide a support member for the shoulder. A display screen 16, such as an LCD, is mounted on the top of the body 11. Preferably, it is disposed at a position where a sight or scope would be located on a gun. The display screen 16 provides graphic display for game playing as well as menu display for various control and selection functions of the electronic game device. The display screen 16 is preferably non-fixedly mounted to the body via a connecting part, which allows the display screen to rotate in a three dimensional range, and to change its mounting height above the body 11, as shown by the arrows in FIGS. 1(a) and 1(b). In one embodiment (not shown), a slot is provided on the top of the main body 11 and the display screen 16 retracts into the slot when not in use. The non-fixed mounting lessens the restriction on the size of the display screen. In an alternative embodiment, two display screens 16a and 16b may be provided adjacent each other as shown in FIG. 1(b). The two display screens may simultaneously display different simulations, such as a radar scan on one screen and a scope of a gun on the other. The display screen is also used to display menus for controlling the game software. A speaker 17 and a vibration device 18 (see FIG. 2) are provided within the main body 11 to simulate the sound and recoil motion of a gun being fired. The speaker 17 can also provide background sounds. The sound and recoil effects may be turned on and off.

In addition to the two trigger devices 15a and 15b, a button 19 may be provided as a launch button for heavier weapons depending on the electronic game being played. The button 19 is preferably located at a position that can be conveniently accessed by a thumb of the player when holding the gun. Additional button(s) 21a, 21b may be provided on the main body 11 or the handles 12a, 12b for additional control functions. For example, when a menu is displayed on the screen 16, the two trigger devices 15a, 15b may be used as Up and Down or Left and Right arrow buttons, and the additional buttons 21a, 21b may be used as Select and Exit buttons, or vice versa.

Figure 2:
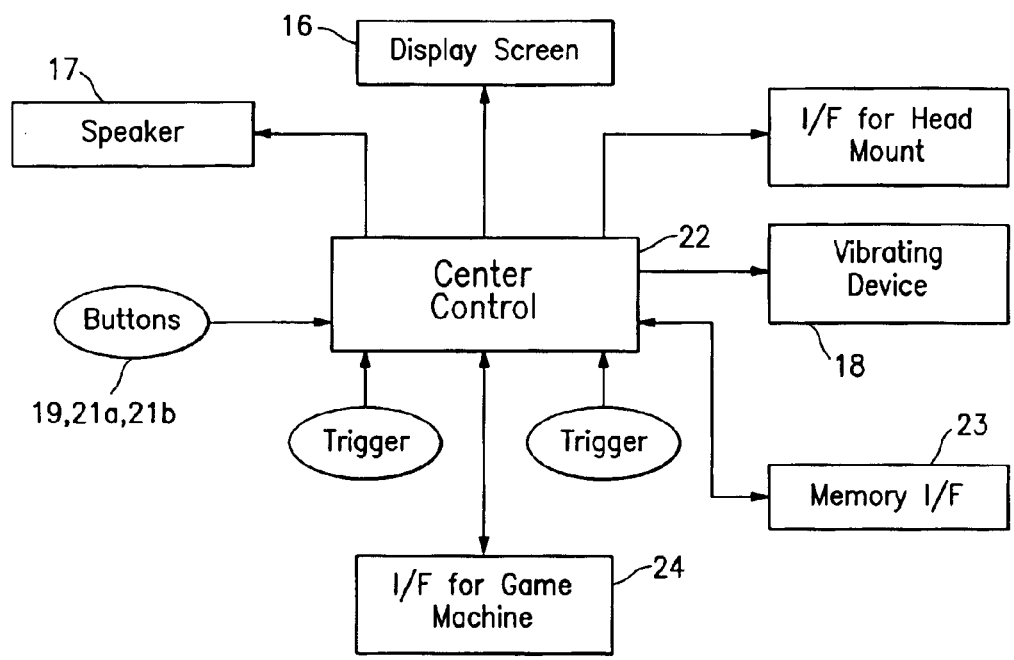
FIG. 2 is a block diagram illustrating the control section and various components of the handheld electronic game device according to an embodiment of the present invention.

Referring to FIG. 2, a control section 22 having appropriate processing hardware is provided within the handheld electronic game device and connected to the various components of the device, such as the trigger devices 15a, 15b, the additional control buttons 19, 21a, 21b, the display screen 16, the speaker 17 and the vibrating device 18, etc. One or more memory card slots 23 are provided on the body for inserting memory cards having game software and/or other data stored thereon (two slots are shown in FIG. 1a, and the insertion of memory cards is indicated by arrows). For example, one memory card may store game software, and the other memory card may be used to store the history of a game play, including the firing conditions and results of the various weapons, etc., and any other data that the player may choose to record. An interface section 24 may be provided for communicating with an external game device as described later.

Optionally, a head-mount display device 30 may be provided and connected to the handheld 10 device via wired or wireless communication. As shown in FIG. 1, the head-mount device may be of sufficiently compact size and can be attached to the handheld device when not worn. The head-mount display device may be used in lieu of the display screen 16 to display game images, such as to simulate a night vision device. Alternatively, it may be used in combination with the display screen 16. Such head-mount display devices have been used in video display and electronic game display, such as the Eye-Trek® device manufactured by Olympus.

The handheld electronic game device shown in FIGS. 1(a), 1(b) and 2 may be played as a stand-alone unit. In this embodiment, the control section 22 contains all game control software and causes the display screen 16 to displays game images. The player controls the firing of weapons based on the game images, and the game images change in response to the firing of weapons.

Figure 3:
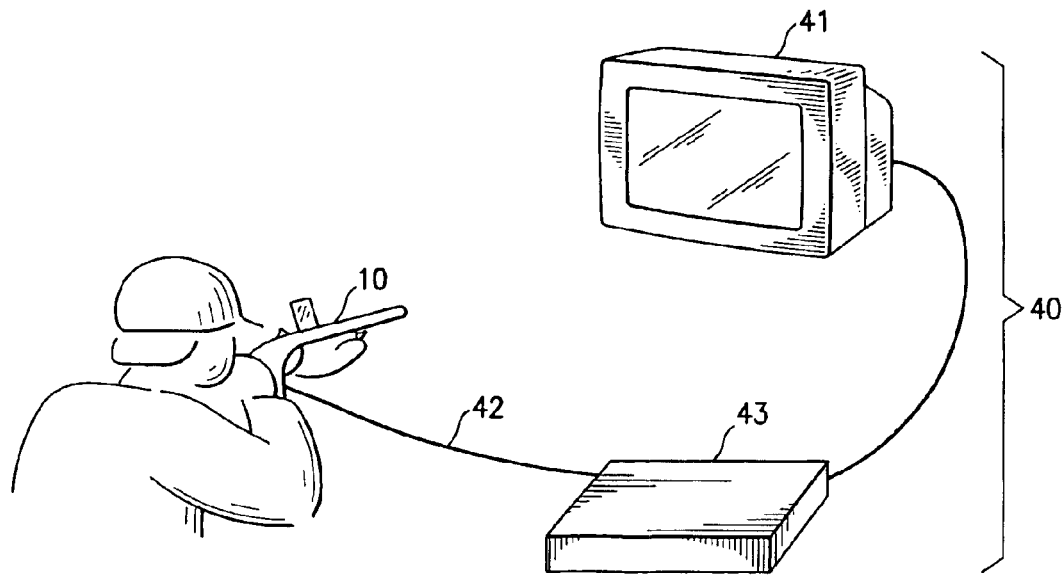
FIG. 3 shows a handheld electronic game device played with an external game unit according to another embodiment of the present invention.

As shown in FIG. 3, the handheld electronic game device 10 can also be played together with an external game unit 40 which has a display screen 41, such as an electronic game machine, a television set, a PC, etc. The system for this mode of playing may have a variety of configurations, and the control functions may reside in different parts of the system. For example, the handheld device may be connected directly to a stationary game machine that integrates a display and game control functions. Alternatively, as shown in FIG. 3, the handheld device 10 may be connected to a portable electronic game device 43 that does not have an image display, and the game device is connect to a display 41 such as a TV that does have game control functions. The various parts of the system may be connected via wired or wireless communication to communicate game data and/or control signals. FIGS. 1(a) and 4 illustrate a wired connection with a wire 42 that connects the handheld device 10 to the external unit 40. The external unit 40, which may also be referred to as a target unit, displays on its display screen 41 one or more targets (such as human figures, natural objects, buildings and other structures, vehicles, airplanes, ships, etc.), so that the player may aim the handheld device at the targets. The target unit 40 and the handheld device 10 are provided with an aiming relationship detection system to detect the aiming of the handheld device with respect to the targets displayed by the target unit. Various such detection systems have been used in electronic game devices and games, such as Namco® (e.g. Guncon 2®), Konami® (e g. Capture Eye®), Sony PlayStation 2® (e.g. Vampire Night® and The Keisatsukan 24H®). In a system described in U.S. Pat. No. 6,328,650, a handheld device receives control signals and video signals from a main game machine, and separates vertical and horizontal synchronizing signals using an HV separator. The handheld device has a photo-sensor to detect light from an aimed-at position on the screen of the main game device, and a position computation section that obtains the coordinates of the aimed-at position based on a detection pulse at that point and synchronizing signals from the HV separator. U.S. Pat. No. 5,672,108 describes an electronic game comprising a gun-shaped emitter unit that emits a beam of infrared radiation, and a target unit having a LCD that displays various targets on the screen. The target unit has four IR sensors located near the four corners of the display to detect which quadrant of the screen receives the strongest IR radiation, and creates output effects based on the nature of the targets present in the aimed-at quadrant.

In one embodiment where the handheld device is played with an external game unit, the display screen on the handheld unit and the display on the external unit are synchronized or coordinated and are responsive to the same input signals generated by the trigger devices and the aiming relationship detection system. For example, the screen of the external unit may display a plurality of targets, and the screen of the handheld unit may display a magnified image of a target being aimed at and a cross hair. The targets displayed on the external unit may be stationary or moving depending on the game software, and the positioning of the magnified target image displayed on the screen of the handheld unit will depend on the aiming of the handheld unit with respect to the target on the screen of the external unit. When the player fires a weapon at a target using the trigger device, the images displayed on both screens may show the target being destroyed. This effect simulates the use of a scope on a gun.

In another embodiment where the handheld device is played with an external game unit, one display screen on the handheld unit has a display that simulates a radar screen or a scan image received from a satellite or other source showing objects that are too far or hidden from the plain view of the player. The heavy weapon firing button 19 on the handheld device may be used to fire a heavy weapon at the far away or hidden object. Another display on the screen may simulate the scope of a gun, and the external unit may display a scene or terrain showing the environment of the player. Those skilled in the art will appreciate that endless varieties of games may be played with the electronic game device according to embodiments of the present invention, taking advantage of the device configuration and display capabilities.

It will be apparent to those skilled in the art that various modification and variations can be made in the handheld electronic game device of the present invention without departing from the spirit or scope of the invention. Thus, it is intended that the present invention cover modifications and variations that come within the scope of the appended claims and their equivalents.

What is claimed is:

1. An electronic game device shaped as a toy gun, comprising:
   a main body;
   two handles connected to the main body and protruding downwardly from an underside of the main body, each handle being adapted to be held by a hand of a player;
   two trigger devices each provided for and located on a respective handle and adapted to be activated by a finger of the player while holding the respective handle; and
   a control section carried within at least one of the main body and the handles,
   wherein the two trigger devices are electrically connected to the control section to provide input signals thereto.

2. The electronic game device of claim 1, further comprising a display screen disposed on a topside of the main body and electrically connected to the control section for display of game images.

3. The electronic game device of claim 2, wherein the display screen is a liquid crystal display device.

4. The electronic game device of claim 2, wherein the display screen is non-fixedly mounted on the main body.

5. The electronic game device of claim 2, wherein the display screen is retractable into a slot provided on the main body.

6. The electronic game device of claim 1, further comprising a speaker and a vibrating device provided within at least one of the main body and the handles for simulating the sound and motion of a gun being fired.

7. The electronic game device of claim 1, further comprising one or more memory card slots provided on at least one of the main body and handles for receiving one or more memory cards.

8. The electronic game device of claim 7, comprising two memory card slots.

9. The electronic game device of claim 1, further comprising control buttons provided on at least one of the main body and the handles and electrically connected to the control section to provide additional input signals thereto.

10. The electronic game device of claim 1, further comprising a head-mount display unit in wired or wireless communication with the control section.

11. The electronic game device of claim 1, further comprising an interface unit for communicating with an external game device.

12. The electronic game device of claim 11, further comprising an aiming relationship detection system adapted to cooperate with an external game unit to detect an aimed-at position with respect to the external game unit.

13. An electronic game system comprising:
   an external game unit having a display screen for displaying game images;
   a handheld unit shaped as a toy gun, the handheld unit comprising:
      a main body;
      two handles connected to the main body and protruding downwardly from an underside of the main body, each handle being adapted to be held by a hand of a player; and
      two trigger devices each provided for and located on a respective handle and adapted to be activated by a finger of the player while holding the respective handle; and
   one or more control sections coupled to the display screen of the external game unit and the two trigger devices of the handheld unit, the control section controlling the images displayed on the display screen of the external game unit in response to input signals received from the two trigger devices.

14. The electronic game system of claim 13, further comprising an aiming relationship detection system provided in the external game unit and the handheld unit to detect an aimed-at position with respect to areas on the display screen of the external game unit, the aiming relationship detection system being coupled to the one or more control sections, the control section controlling the images displayed on the display screen of the external game unit in response to input signals received from the aiming relationship detection system.

15. The electronic game system of claim 13, wherein
   the handheld unit further comprises a display screen for displaying game images;
   the one more control sections are further coupled to the display screen of the handheld unit,
   the control sections further control the images displayed on the display screen of the handheld unit in response to input signals received from the trigger device, and wherein the control sections are capable of displaying correlated images on the display screen of the external game unit and the display screen of the handheld unit.

16. The electronic game system of claim 15, further comprising an aiming relationship detection system provided in the external game unit and the handheld unit to detect an aimed-at position with respect to areas on the display screen of the external game unit, the aiming relationship detection system being coupled to the one or more control sections, the control section controlling the images displayed on the display screen of the handheld unit in response to input signals received from the aiming relationship detection system.

* * * * *